United States Patent [19]

Gerfast

[11] Patent Number: 4,573,096
[45] Date of Patent: Feb. 25, 1986

[54] CLAM-SHELL CARTRIDGE FOR RECORDING DISC

[75] Inventor: Sten R. Gerfast, Mendota Heights, Minn.

[73] Assignee: Minnesota Mining and Manufacturing Company, St. Paul, Minn.

[21] Appl. No.: 451,037

[22] Filed: Dec. 20, 1982

[51] Int. Cl.⁴ .................................................. G11B 23/02
[52] U.S. Cl. ..................................................... 360/133
[58] Field of Search ..................... 360/97, 98, 99, 133, 360/135; 206/444

[56] References Cited

U.S. PATENT DOCUMENTS 3,882,701 5/1975 Wirth ........................................ 70/63
4,184,184 1/1980 Hedin et al. ........................ 360/133

Primary Examiner—John H. Wolff
Attorney, Agent, or Firm—Donald M. Sell; James A. Smith; David W. Anderson

[57] ABSTRACT

A receptacle and a cover open like a clam shell to a small angle for access by transducing heads to a magnetic recording disc which is rigid at least at its hub. When closed, the rigid hub is forced into a seat at a drive-access opening in the receptacle, and this seating plus peripheral contact between the cover and the receptacle provide an essentially dust-proof chamber for the recording disc.

7 Claims, 7 Drawing Figures

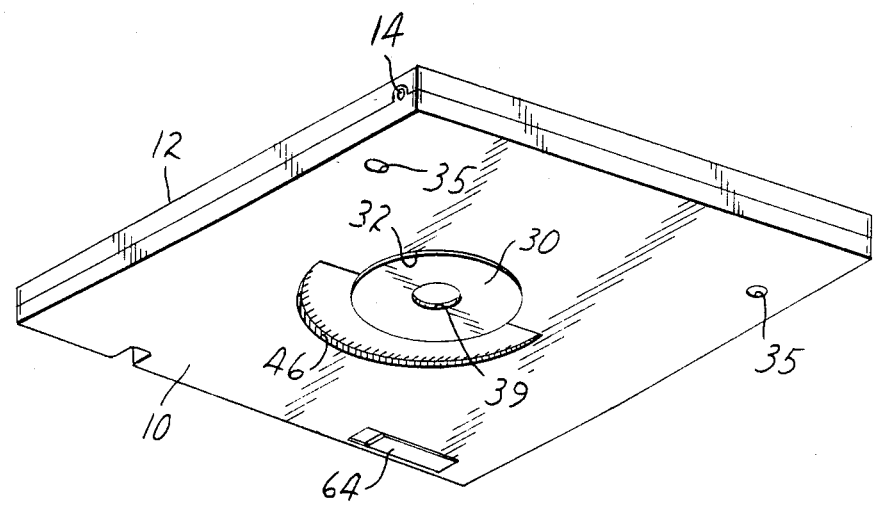
FIG. 1
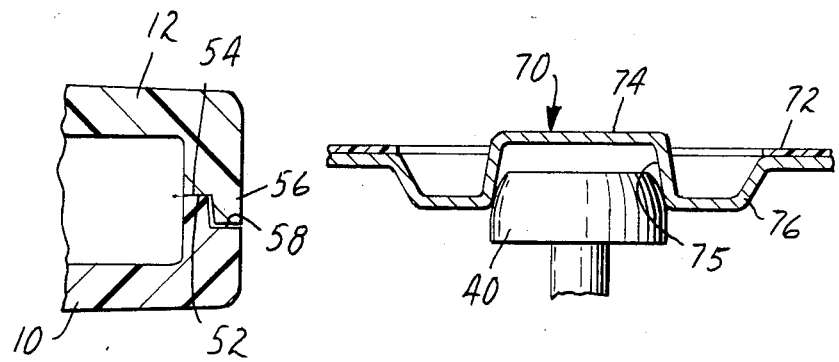
FIG. 6  FIG. 7

CLAM-SHELL CARTRIDGE FOR RECORDING DISC

TECHNICAL FIELD

The invention concerns a cartridge for a recording disc, especially a rigid magnetic recording disc.

BACKGROUND ART

Rigid magnetic recording discs need to be protected by rigid, box-like housings or cartridges made of plastic. Such cartridges may have a door for access by a recording head or heads, as does the cartridge of U.S. Pat. No. 4,184,184 (Hedin et al.), or a removable cover for access by both a drive mechanism and a recording head or heads, as does the cartridge of U.S. Pat. No. 3,882,701 (Wirth). Because the cartridge should be substantially dust-tight, the door or cover may rub against the housing during opening and closing, and this may generate plastic dust that could gravitate to the recording disc. Cartridges in current use are of rather complex manufacture and expensive.

DISCLOSURE OF INVENTION

The recording-disc cartridge of the present invention is far less expensive than are the aforementioned cartridges while providing the same advantages, including being substantially dust-tight. It is preferably molded plastic, as are the aforementioned cartridges, but because there need be very little rubbing during opening and closing, very little plastic dust is generated. Hence, it is believed that the novel cartridge should provide as clean a disc environment as does any cartridge of the prior art. While being useful for rigid recording discs, the invention requires only that the hub of the disc be rigid.

Specifically, the novel cartridge comprises a rigid receptacle having a broad face including a central drive-access opening providing a continuous circular seat for a rigid disc hub, a rigid cover hinged like a clam shell to the receptacle at their edges and, when closed, contacting (a) the receptacle along a continuous path enclosing the recording disc and (b) a rigid portion of the disc which is integral with the hub to force the hub into the seat of the receptacle, and means outside said path for latching the cover to the receptacle to enclose the disc within a substantially dust-tight chamber completed by the contact along said path and the seating of the hub.

In order for the chamber to be substantially dust-tight, there should be no opening through the hub of the recording disc leading to a recording surface of the recording disc. Hence, if the recording disc has a central spindle opening, there should be a bonnet over the spindle opening to prevent dust from passing through the spindle opening to a recording surface.

A preferred plastic from which the cover and receptacle may be molded is polycarbonate because it is readily moldable to uniform dimensions and has superior impact resistance, dimensional stability, and resistance to plastic flow. In spite of these superior properties compared to equally economical plastics, one cannot expect to mold plastic covers and receptacles that when closed will both perfectly seat a disc hub and perfectly contact each other along the full length of the aforementioned continuous path. To allow for imperfections, the receptacle and cover may be formed to create a narrow labyrinthine opening radially beyond the continuous path in order to inhibit the passage of dust through any gaps in the receptacle-cover contact along that path. For economy of manufacture, the aforementioned path should lie in a plane approximately parallel to the broad face of the receptacle.

If the walls of that labyrinthine opening were to rub against each other during closing of the cartridge, plastic dust would be generated. To avoid this, the receptacle and cover may be formed with tapered members adjacent their edges opposite to their hinged edges and outside the aforementioned continuous path in order to guide the closing, thus limiting any rubbing to a small area.

The invention may have its greatest utility when its recording disc is of the type shown in U.S. Pat. No. 3,373,413 (Treseder) or in German Offenlegungsschrift No. 2,342,890 (Boissevain). These and a number of other patents show magnetic recording discs, each consisting of a flexible magnetic recording sheet stretched across a rigid support like a drumhead. If the rigid support has a central spindle opening, the recording sheet can serve as a bonnet to prevent dust from passing through the spindle opening to a recording surface. Such a recording disc can be made far less expensively than ordinary rigid magnetic recording discs in that the rigid support can be stamped out of sheet metal. By selecting an alloy which experiences very little expansion or contraction over the temperature range to be encountered in use, far better dimensional stability can be realized as compared to unsupported flexible magnetic recording discs now in widespread use.

Transducing heads presently used with rigid magnetic recording discs are small and light in weight and are generally supported by relatively long, thin arms which occupy very little space above the recording surface or surfaces. Accordingly, the cover of the novel cartridge need only be openable like a clam shell to a small angle such as between 5 and 15 degrees in order to provide access by the transducing head or heads.

While the present invention is especially useful for protecting the recording surfaces of magnetic recording discs, other types of recording surfaces are also useful, including electrostatic surfaces and optically-recordable surfaces. The disc may be magnetically and optically recorded in different areas to provide respectively erasable and permanent recordings.

THE DRAWINGS

In the drawing:

FIG. 1 is an isometric view from the under, receptacle side of a cartridge of the invention;

FIG. 6 is a partial section through the edges of the closed cartridge; and

FIG. 7 is a fragmentary central section through a drive spindle and a rigid recording disc having a bonnet over its spindle opening.

Figure 2:
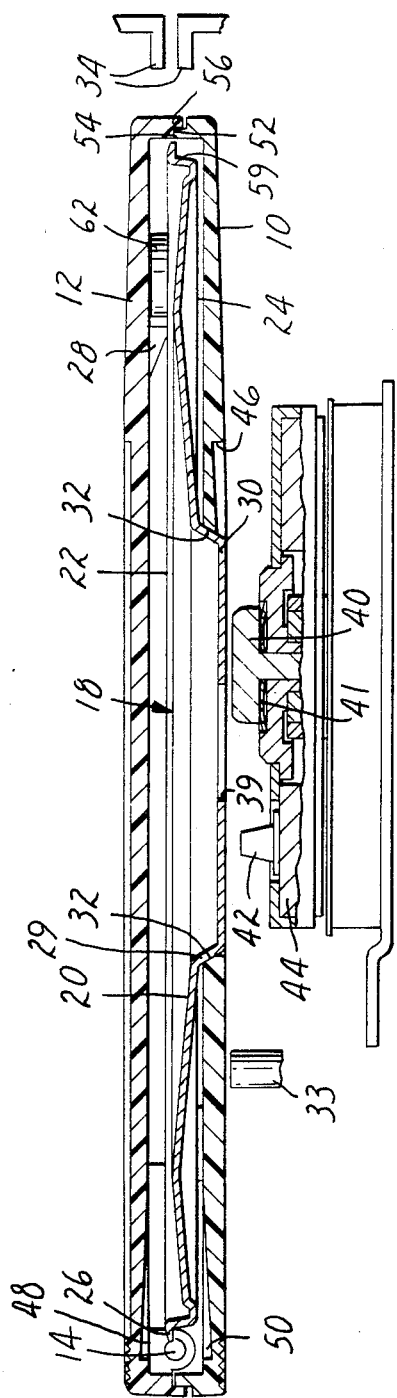
FIG. 2 is a schematic side view of a drive mechanism showing a cartridge of FIG. 1 being inserted, the cartridge and part of the drive being cut away to a central section.
Figure 3:
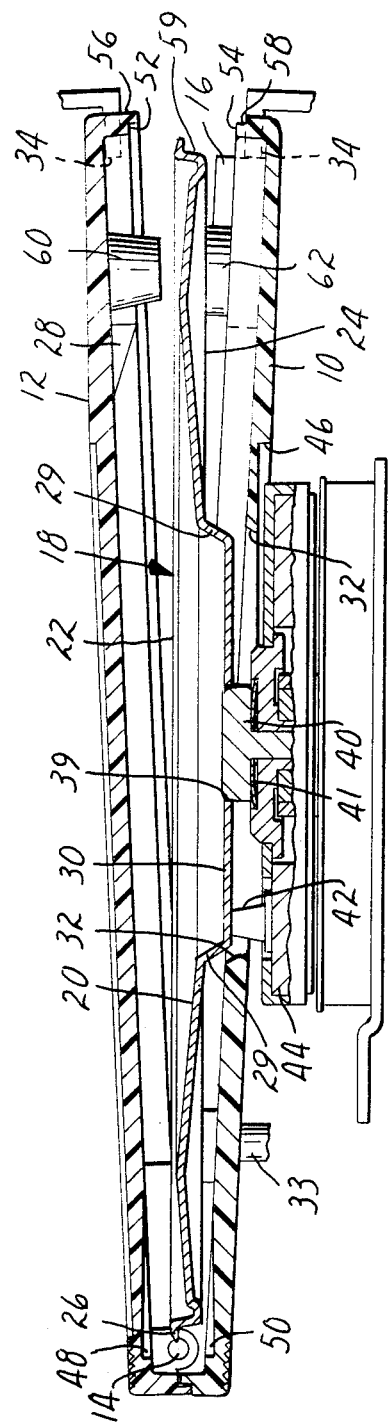
FIG. 3 is a schematic side view similar to that of FIG. 2 except with the cartridge in operative position.
Figure 4:
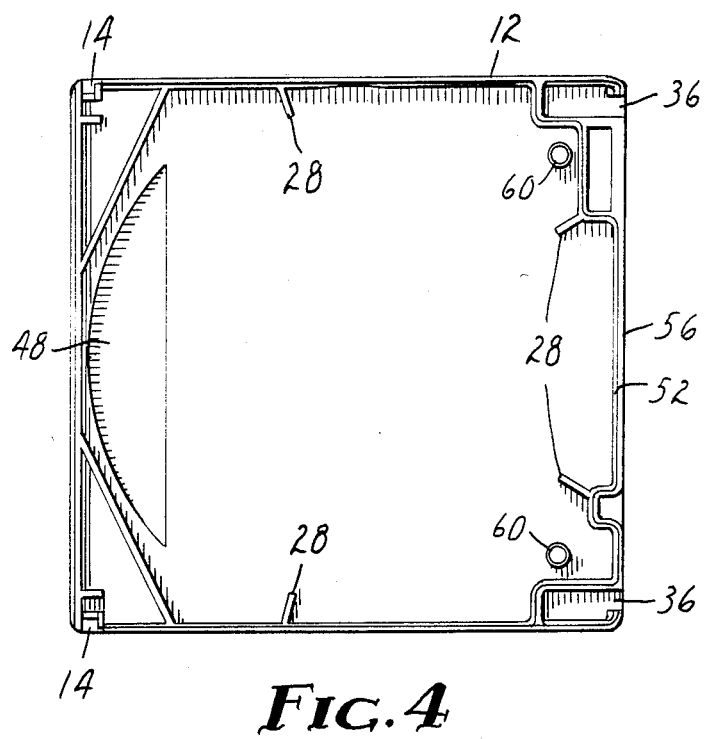
FIG. 4 is a plan view of the interior of the cover of the cartridge of FIG. 1.
Figure 5:
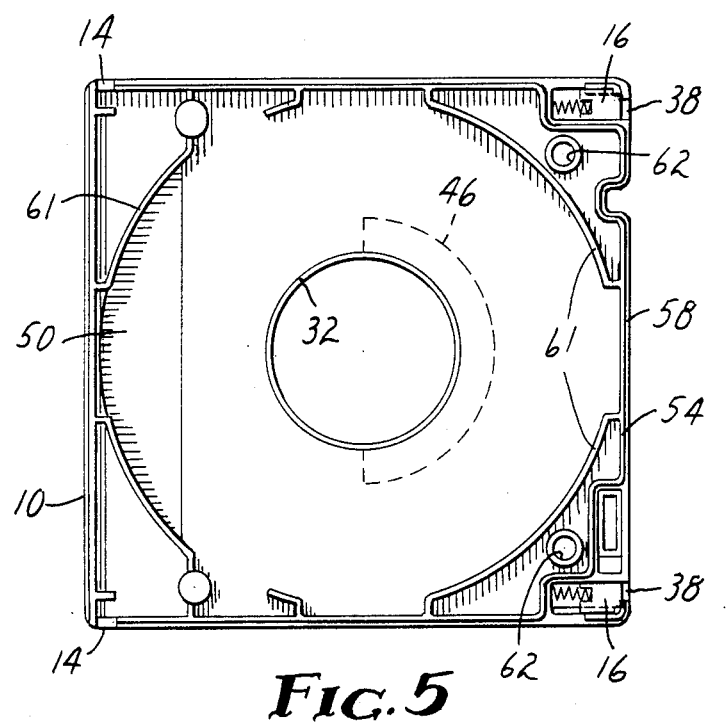
FIG. 5 is a plan view of the interior of the receptacle of the cartridge of FIG. 1.

The cartridge shown in FIGS. 1-6 has a receptacle 10 having a broad, flat panel including a central drive-access opening. A cover 12 is connected to the receptacle 10 by two hinge pins 14 at one edge, and there are two latches 16 at the opposite edge. As seen in Figs. 2 and 3, the cartridge contains a magnetic recording disc 18 consisting of a rigid support 20 and two magnetic recording sheets 22, 24 stretched across the support. The support has a peripheral rim 26 to which the outer edge of the recording sheet 22 is secured. Four projections 28 on the underside of the cover contact the rim 26 to force a conical surface 29 of a hub 30 of the rigid support 20 against a correspondingly conical seat 32 in the receptacle 10 when the cartridge is closed.

Upon being inserted into a drive mechanism as shown in FIG. 2, two positioning pegs 33 on the drive fit into openings 35 in the receptacle. Also, four prongs 34 on the drive fit into cartridge openings 36 and 38 (see FIGS. 4 and 5) to unlatch and lift the cover 12 while lowering the receptacle 10 to the open clam-shell position shown in FIG. 3. The lowering of the receptacle allows a central opening 39 in the hub 30 of the rigid disc support 20 to fit onto a tapered spindle 40 which can move axially a short distance against the bias of a shaped annular leaf spring 41.

The turntable for the drive is provided by three symmetrically-positioned magnetically-soft steel buttons 42 (one seen in FIGS. 2 and 3) which are adhered to the face of a permanent-magnet rotor 44. The rigid disc support 20 is also magnetically soft, and the strength of the magnet is such that the magnetic attraction draws the disc support 20 tightly against the spindle 40 and causes the spindle to retract slightly against the bias of the leaf spring 41, thus securing the support to the turntable. Magnetic heads (not shown) are then moved from a retracted position through the opening between the receptacle 10 and cover 12 into operative positions.

The outer face of the receptacle 10 has a half-moon recess 46 to insure that there is no contact with any rotating parts of the drive. Each of the interior faces of both the cover 12 and the receptacle 10 in the vicinity of the hinge pins 14 also has a half-moon recess 48, 50, respectively, to provide added clearance from the recording disc 18 during its rotation.

Each of the cover 12 and receptacle 10 has a continuous abutment 52, 54, respectively, which when the cartridge is closed substantially contact each other along a continuous path lying in a plane generally parallel to the broad faces of the receptacle. These abutments in combination with the seating of the rigid disc hub 30 against the conical seat 32 of the receptacle create a substantially closed chamber for the recording sheets 22, 24. As seen in FIG. 6, a flange 56 on the cover 12 and a corresponding undercut 58 on the receptacle 10 provide a labyrinthine passage from the chamber to the external portions of the cartridge via any accidental spacing between the abutments 52, 54.

When the disc support 20 rests in the circular seat 32, its peripheral surface 59 is nested within a discontinuous cylindrical flange 61 on the interior face of the receptacle 10. This permits vertical loading, because the flange 61 holds the disc support 20 in place while the cartridge is being opened until the disc support is secured to a drive.

During closing of the cartridge, a pair of truncated cones 60 projecting from the cover 12 fit into tapered openings 62 in the receptacle. If the cover and receptacle are misaligned, the only rubbing should be at those cones and tapered openings, thus minimizing any generation of plastic dust, because the cover flange 56 and the receptacle undercut 58 should be adequately spaced not to rub against each other until any mis-alignment has been corrected at the cones 60 and tapered openings 62.

Any plastic dust generated by rubbing at the hinge could be eliminated by employing a living hinge of polypropylene or other plastic which endures repeated flexing without failure. The hinges could instead be moved to the exterior of the cartridge as in U.S. Pat. No. 4,211,337 (Weavers et al.). Either such variation would further simplify assembly.

As seen in FIG. 1, the broad panel of the receptacle 10 has a record-lockout button 64.

The cartridge shown in FIGS. 1-6 has only eight parts, namely, cover, receptacle, and two hinge pins, two latches and two springs for the latches. By employing a living hinge, there would be only five parts. Assembly is quite simple and readily adapted to automation in a sealed room. Prototypes have been successful in housing magnetic recording discs 13 cm in diameter with a thickness when closed of 0.5 cm and when open of about 4 cm.

As seen in FIG. 7, the novel cartridge may contain a rigid recording disc 70 having a magnetic recording layer 72, and there may be a bonnet 74 covering the spindle-receiving opening 75 of the disc. The hub of the disk 70 also has a conical area 76 which fits into a correspondingly conical seat (not shown) such as the seat 32 of the receptable 10 of FIGS. 1-6. Hence, dust passing through the opening of that seat is prevented from reaching the magnetic recording layer 72.

I claim:

1. A cartridge for containing a recording disc having a rigid hub including a conical sealing surface, said cartridge comprising:

a rigid receptacle having a broad panel including a central drive-access opening providing a continuous conical seat adapted to sealingly receive said hub sealing surface;

a rigid cover hinged to the receptacle and movable between an open position and a closed position wherein said cover contacts (a) the receptacle along a continous path enclosing the recording disc and (b) a rigid portion of the disc which is integral with said hub to force said hub conical sealing surface into said receptacle conical seat; and means outside said path for latching said rigid cover to said rigid receptacle to enclose said disc within a substantially dust-tight chamber defined by said contact along said path and said contact between said hub sealing surface and said receptacle conical seat.

2. A cartridge as defined in claim 1 including a cylindrical flange on said receptacle and a rigid peripheral surface on said disc which nests within said flange to facilitate vertical loading.

3. A cartridge as defined in claim 1 including at least three projections on said cover which contact said rigid portion of said recording disc when said cover is closed.

4. A cartridge as defined in claim 3 for a recording disc wherein said rigid portion is a peripheral rim and said projections are located to contact said rim when the cover is closed.

5. A cartridge as defined in claim 4 wherein the recording disc includes a central spindle opening and a bonnet over the spindle opening to prevent dust from passing through the spindle opening into the chamber.

6. A cartridge for containing a recording disc having a rigid circular peripheral rim, a rigid hub including a central spindle opening and a conical sealing surface surrounding said spindle opening, and a flexible recording sheet stretched across said rim to close said spindle opening, said cartridge comprising:
a rigid receptacle having a broad panel including a central drive-access opening providing a continuous conical seat adapted to sealingly receive said hub sealing surface;
a rigid cover hinged to said receptacle and including at least three projections said cover being movable between an open position and a closed position wherein (a) said cover contacts said receptacle along a continuous path enclosing said recording disc and (b) said at least three projections contact said peripheral rim of said disc to force said hub sealing surface into said receptacle conical seat; and
means outside said path for latching said cover to said receptacle to enclose said disc within a substantially dust-type chamber defined by said contact along said path and said contact between said hot sealing surface and said receptacle conical seat.

7. A cartridge as defined in claim 6, wherein said flexible recording sheet carries a magnetic recording layer.

* * * * *